United States Patent [19]

Dion et al.

[11] Patent Number: 4,516,167
[45] Date of Patent: May 7, 1985

[54] COMPRESSION OF THE DYNAMIC RANGE OF VIDEO SIGNALS

[75] Inventors: Donald F. Dion, Burlington; Michael J. Cantella, Winchester, both of Mass.

[73] Assignee: RCA Corporation, New York, N.Y.

[21] Appl. No.: 445,479

[22] Filed: Nov. 30, 1982

[51] Int. Cl.³ .............................................. H04N 5/14
[52] U.S. Cl. ................................................... 358/160
[58] Field of Search .............. 358/160, 161, 162, 163, 358/164, 165, 166, 167, 36, 37, 113; 333/14; 455/72; 382/51, 52, 54, 56

[56] References Cited

U.S. PATENT DOCUMENTS 4,091,420  5/1978  Omori et al. ....................... 358/167
4,326,258  4/1982  de la Guardia ..................... 382/52
4,353,092  10/1982  Bailey et al. ..................... 358/160
4,445,138  4/1984  Zwirn et al. ..................... 358/160

Primary Examiner—Tommy P. Chin
Assistant Examiner—Michael D. Parker
Attorney, Agent, or Firm—Joseph S. Tripoli; George E. Haas; Allen LeRoy Limberg

[57] ABSTRACT

Video signals are subjected to two-dimensional high-pass spatial filtering as a first step in reducing their dynamic range. Then, in a second step of the compression process, differentiation spikes generated in response to edges of large objects in the original video signals are suppressed. This is done in real time using an adaptive non-linear amplifier, the gains of which in a number of amplitude zones are controlled by a histogram of the high-pass-filtered video signals.

8 Claims, 3 Drawing Figures

COMPRESSION OF THE DYNAMIC RANGE OF VIDEO SIGNALS

The present invention concerns a method for real-time compression of the dynamic range of video signals generated by certain imaging systems, descriptive of images with greater dynamic range than can be accommodated by a television display system and the human visual system, and apparatus for implementing this method.

For example, the 40 dB or so dynamic range of the conventional cathode ray tube television display device is substantially exceeded by the 80 dB or so dynamic range of an infrared focal plane array using Schottky barrier diode sensing elements. If the video signal out of such an IR-FPA sensor is simply linearly attenuated, so the display system can accommodate peak excursions of the video signal, some portions of the image at lower contrast levels will be lost to the human observer. Larger objects will be perceived to lower contrast levels than will small objects or non-recurrent structural details of larger objects.

In dynamic range compression aimed at preserving perceived image detail the inventors note that for the most part it is acceptable to compress the amplitudes of video signals descriptive of large objects relative to the amplitudes of video signals descriptive of small objects and details of large objects. This is, in terms of the spectra descriptive of display images, it is for the most part acceptable to attenuate low spatial frequencies relative to high spatial frequencies. Removing substantial portions of the low spatial frequency content of the image energy spectrum is a first step that is taken in the invention to provide dynamic range compression prior to display, which step does not seriously compromise the ability of the human visual system to perceive large objects in the display.

An image in which the low spatial-frequency portion of the spectral response has been suppressed by time-invariant filtering is spatially differentiated, and the amplitude varations in the differentiated response attributable to detail information will undesirably tend to be contaminated by spike responses to the edge transitions of large objects in the image being spatially differentiated. The suppression of these latter spike responses is, then, a second step that the inventors find should be taken after the first step of removing low spatial frequencies from the image spectrum. To be able to suppress these spike responses one must be able to distinguish them from response to small objects and to detail information in larger objects. In many (if not most) images the statistical likelihood of an edge transition associated with a large object occurring in a randomly chosen pixel is small compared to the likelihood of a small object or structural detail in a large object occurring in the pixel. This fact is used as a basis for distinguishing against spike responses in the invention. Levels of amplitude appearing less frequently, and therefore more likely to be attributable to edge transitions for large objects, are selectively suppressed in the invention.

Summarizing, the present invention is embodied in compression method and apparatus, operative on a real-time basis, for reducing the dynamic range of video signals by suppressing low spatial frequency content and then selectively suppressing response to less frequently occurring amplitude levels in the remaining high spatial frequency content. This suppresses response to transient spikes associated with major changes between input video signal levels, while preserving response to plateaus of minor changes in input video signal levels.

Figure 1:
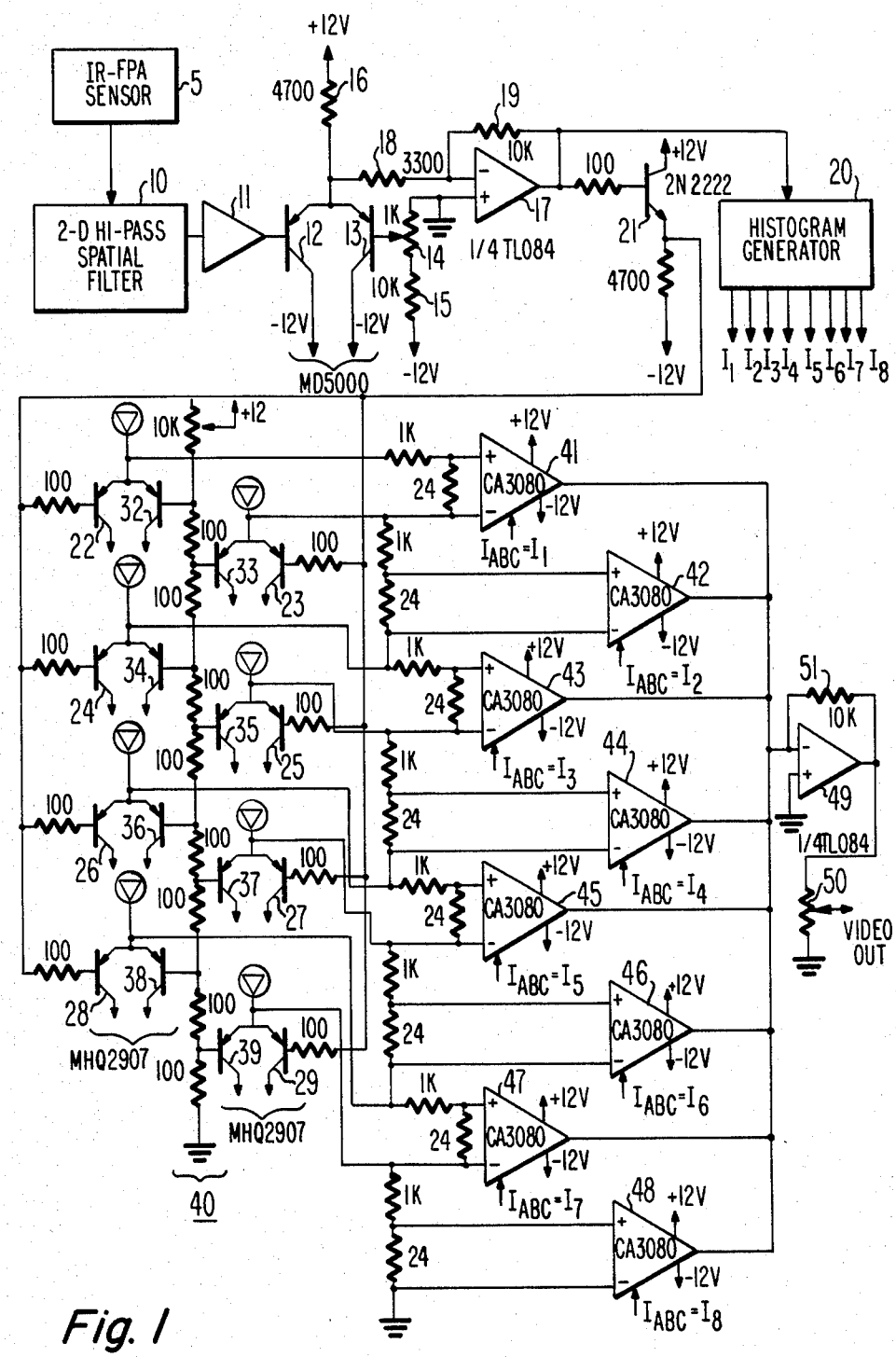
FIG. 1 is a schematic diagram of a compressor constructed in accordance with the invention.

In FIG. 1 raster-scanned video input signal with wide dynamic range is supplied from means, such as an IR-FPA sensor 5, to a two-dimensional high-pass spatial filter 10. In a particular design a 655.2 kHz clock rate is used in the IR-FPA sensor 5; and the sensor includes a comb-filter (not specifically shown) for nulling the Nyquist rate of 327.6 kHz and its harmonics, which comb-filter is provided by an unterminated analog delay line. The two-dimensional spatial filter 10 realized by tapped analog delay line is designed to peak at 182 Nyquist rate, or 245.7 kHz. The spatial filtering is done using an abbreviated three-point-by-three-point filter array, the weighting coefficients of which may be expressed by the matrix following:

A B C

D E F

G H J

In this matrix B, D, F and H are zero-valued and taps for supplying signals to be multiplied by these coefficients are omitted from the tapped delay line. In the remaining five-element kernel, E equals +1.10 and A, C, G and J each equal −0.25. A 21:1 peak-to-null ratio is obtained. The two-pixel delays between signals to be multiplied by J and G and between signals to be multiplied by C and A are conveniently provided by LC networks; and the line-less-a-pixel delays between signals to be multiplied by G and E and between signals to be multiplied by E and C are conveniently provided by charge-coupled-device analog delay lines. Buffer amplifier 11 following filter 10 has about a 1 MHz roll-off frequency, and black-level at its output is nominally −0.7 volts.

The high-pass-filtered video signal at the output of buffer amplifier 11 has positive-going sync and is applied to the base of a PNP transistor 12, half of an MD5000 emitter-coupled pair. For white- or negative-going portions of the signal at its base, transistor 12 acts as an emitter follower with emitter load resistor 16, as the base-emitter junction of the other PNP transistor 13 in the pair is reverse-biased. This, owing to the base of transistor 13 being biased to −0.7 V by the adjustable potential divider comprising the potentiometer 14 and dropping resistor 15. The base-emitter junction of transistor 13 conducts to clamp the emitter of transistor 12 when there is a tendency for signal at their joined emitters to swing positive with respect to ground. The base-emitter junction of transistor 2 reverse-biases as its base continues to swing more positive than −0.7 V. So, the high pass filtered video at the joined emitters of transistors 12 and 13 has blacker-than-black sync remnants and differentiation transients clipped off it. An inverting amplifier connection of a differential-input amplifier 17

(e.g. one of the four operational amplifiers in a TL084) and resistors 18 and 19 responds to this signal to provide always-positive video response with white more positive than black, for application as input signal to histogram generator 20.

As noted above, response to levels of amplitude like to appear less frequently in the output signal from the high-pass spatial filter 10 are to be suppressed in the final VIDEO OUT signal. To accommodate a variety of IR-FPA sensor 5 output signals when there is no foreknowledge of the statistics of amplitude levels in these signals, this must be an adaptive non-linear amplification process. In furtherance of this adaptive non-linear amplification process the histogram generator 20 is used to determine the statistics of one or more image fields of sensor 5 output on a running basis. In most imaging tasks involving a single sensor array, the sensor array position does not change so rapidly respective to the objects being imaged that the statistics of amplitude levels from one field to the next are likely to change appreciably. So the statistics of one image field are likely to be applicable to the next, and the FIG. 1 system is a system designed for this particular type of task. (Where the sensor array position changes rapidly respective to the objects being imaged, a trend in the statistics over a few image fields of time can be determined on a whole-field or segmented-field basis; and the trend can be used to modify the statistics of the most recently completed image field to provide a still better projection of the statistics of the current image field.) To complete the adaptive non-linear amplification process, successive portions of the video output of amplifier 17 are to be separated according to what portion of the total, or sub-range, or zone of the total dynamic range of this signal they fall into. These zones correspond to those for which amplitude-level statistics are accummulated in histogram generator 20. The separated portions of the video amplifier 17 output are then to be selectively amplified by factors dependent on the corresponding portions histogram. In furtherance of the separation of video amplifier 17 output into amplitude-level zones for subsequent selective amplification, the video output of amplifier 17 is also applied to the base of an NPN emitter-follower transistor 21. Transistor 21 introduces a —0.7 V base-to-emitter offset into the signal, which is used to compensate for the base-emitter offsets of PNP transistors 22–29 to the bases of which the emitter potential of transistor 21 is applied. PNP transistors 22–29 are in emitter-to-emitter connection with respective ones of PNP transistors 32–39. Each emitter-to-emitter connection receives bias current from a respective current generator (e.g., each of which may simply comprise a respective resistor to a positive supply rail, or each of which may be a self-biased depletion-mode transistor). The bases of transistors 32–39 are biased to successively less positive voltages by a resistive ladder 40 between ground and a positive operating voltage. This causes successively less severe base-line clipping of the video signals at the emitter connections of transistors 22–29.

Differential-input controllable-gain amplifiers 41–48 are then used to differentially combine video signals base-line clipped in successively less severe degrees, and their output signals are summed as input to an output video amplifier 49 supplying piecewise-linearly amplified video output signal to output potentiometer 50. To facilitate summing of their output signals differential-input controllable-gain amplifiers 41–48 are preferably operational transconductance amplifiers (OTA's), such as the CA3080's shown in FIG. 1. The transconductance of an OTA is controlled in proportion to its amplifier bias control current, or $I_{ABC}$. Output video amplifier 49 is shown as comprising an operational amplifier grounded at its non-inverting input and provided with a voltage feedback resistor 51 from its output to inverting input connection. This negative feedback connection, because of the open loop high voltage gain of the operational amplifier, maintains at inverting input connection of the operational amplifier a short-circuit load for the OTA's 41–48; and the output video amplifier 49 acts as a linear current-to-voltage converter.

The common-mode rejection of differential-input amplifier 41 causes it to be non-responsive to the video signals at the emitters of transistors 22 and 23 when they are not large enough for either signal to be clipped. When the video signal at the emitter of transistor 22 is not clipped, but that at the emitter of transistor 23 is, amplifier 41 responds to the video signal at the emitter of transistor 23, as divided down by a resistive potential divider to accommodate the limited differential input voltage range for which amplifier 41 has substantially linear transconductance. When the video signals at the emitters of both transistors 22 and 23 are clipped, amplifier 41 has substantially direct response to the clipping level at the emitter of transistor 22 minus the lower clipping level at the emitter of transistor 23.

Figure 2:
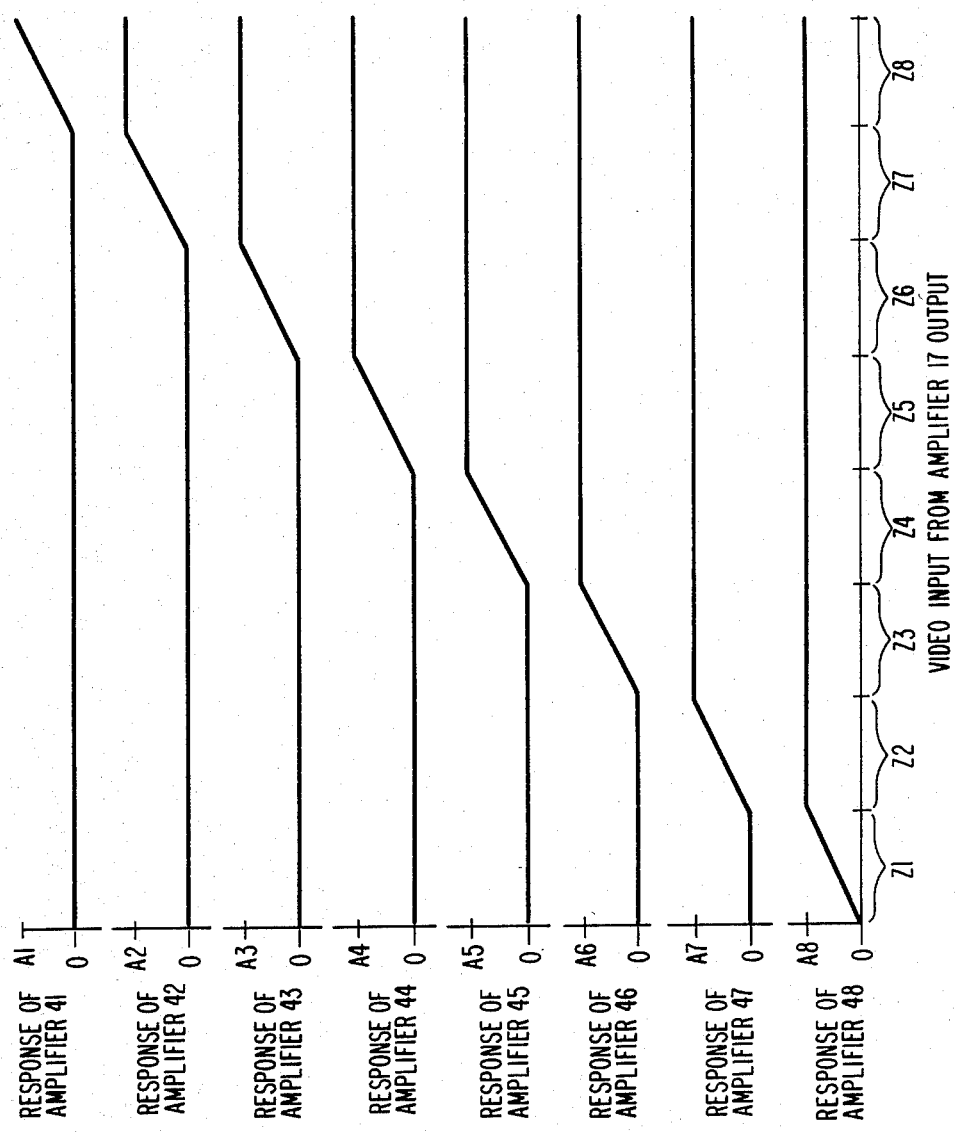
FIG. 2 is a diagram of the responses of component amplifiers in the compressor.

The responses of each of the differential-input amplifiers 42–48 can be analyzed analogously to that of amplifier 41. FIG. 2 plots responses of the amplifiers 41–48 to each of eight successively higher amplitude ranges or zones Z1, Z2, Z3, Z4, Z5, Z6, Z7 and Z8 of video input signal from the emitter-follower transistor 21. A1, A2, A3, A4, A5, A6, A7 and A8 are the maximum transconductance of the OTA's of 41, 42, 43, 44, 45, 46, 47 and 48 for the values $I_1$, $I_2$, $I_3$, $I_4$, $I_5$, $I_6$, $I_7$ and $I_8$ of $I_{ABC}$ gain-control signals. If all the gains A1, A2, A3, A4, A5, A6, A7 and A8 were equal, the sum of the responses of amplifiers 41–48 would be a linear response in the video input signal from emitter-follower transistor 21.

Independently programming the gains of amplifiers 41–48 will allow the gain for dynamic portions of the signals in each of the amplitude regions Z1, Z2, Z3, Z4, Z5, Z6, Z7 and Z8 to be independently adjusted. Adjusting these gains in accordance with a histogram of signal levels allows the gain in amplitude ranges less likely to occur in the signal to be reduced respective to the gains in amplitude ranges more likely to occur, presuming the histogram derived from video signals descriptive of image in a previous time interval predicts reasonably accurately the amplitude statistics of the video signals from the more current image. The apparatus in FIG. 1 between emitter-follower transistor 21 and output video amplifier 49 operates then as an adaptive filter, slicing out ranges of the signal not apt to be useful, thereby to reduce relative to the useful portions of the signal the energy in the transient spikes generated by differentiation in high-pass filter 10.

Figure 3:
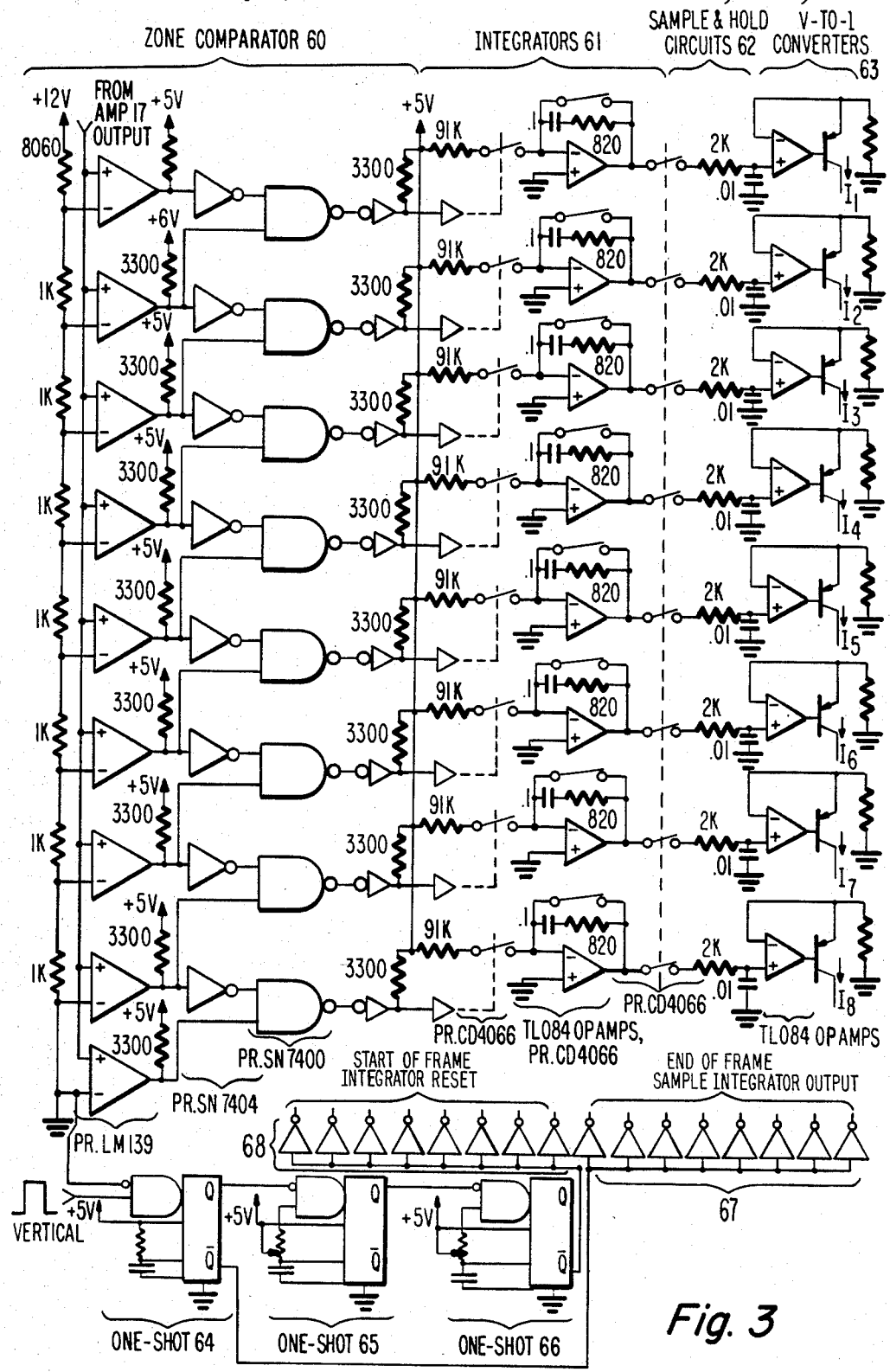
FIG. 3 is a schematic diagram of the histogram generator used in the FIG. 1 compressor.

FIG. 3 illustrates how histogram generator 20 may be constructed using a zone comparator 60 to determine in which of the eight amplitude ranges, or zones Z1–Z8, is the video signal supplied from the output of amplifier 17. Each component window comparator supplies a logic ZERO output, except for the component window comparator in the window of which the video signal is. That comparator supplies a logic ONE. The logic ONE closes the one of the CD4066 analog gates at the inverting input of a selected one of the set 61 of integrators to provide it current for integration to increase its output average; and the logic ZEROs open the others of the CD4066 analog gates at the inputs of the remainder of the set 61 of integrators depriving them of input currents, so their output voltages do not increase so long as the video signal remains in the same window. The set 61 of integrators provides Riemann integrals with respect to time of each of the zone comparator 60 outputs. At the end of a frame of video signal the outputs of the set 61 of integrators are sampled-and-held as the CD4066 analog gates at their outputs are made conductive to charge 0.01 microfarad hold capacitors in the set 62 of sample-and-hold circuits. During the following frame the currents $I_1$, $I_2$, $I_3$, $I_4$, $I_5$, $I_6$, $I_7$ and $I_8$ are generated responsive to these sampled-and-held potentials by a set 63 of voltage-to-current converters. Each of these currents is the collector current of a respective common-emitter PNP transistor flowing responsive to an emitter current flowing in accordance with Ohm's Law through a respective emitter degenerative resistor, across which resistor a voltage equal to one of the sampled-and-held voltages is maintained by emitter-to-base degenerative feedback provided by a respective operational amplifier (shown as one of the four operational amplifiers in a TL084).

A vertical retrace blanking pulse input (bottom, left of FIG. 3) is used to time the taking of the histogram. One-shot 64 responds to the leading edge of the blanking pulse to apply the end-of-frame signal to a bank 67 of logic inverters, respective ones of which close the CD4066 analog gates in the set 67 of sample-and-hold circuits. The end-of-frame signal being over, one-shot 64 resets, setting a one-shot 65 to set a one-shot 66. The setting of one-shot 66 provides a start-of-frame signal to a bank 68 of logic inverters, respective ones of which close the CD4066 analog gates in the set 61 of integrators for initializing their Riemann integral outputs to zero. One-shot 66 resets itself after one-shot 65 does, and the new frame of video is used to generate an updated histogram. A number of variations of the compressor described above are possible. There is a possibility of using the same emitter-coupled pairs in both the process of the slicing of the analog video into ranges and the process of zone comparison, for example. The number of zones or ranges into which the high-pass-filtered video input signal is divided can be altered, increased if one would like to provide increased number of piecewise-linear segments in the compressor response. While the set 63 of voltage-to-current converters are linear, non-linearities can be introduced into these converters (e.g., to provide gamma compensation).

Digital designs which allow for real-time processing can be based on the analog processes described above, supposing an analog-to-digital converter with a sufficient number of bits of resolution is available that permits real-time digitization of the video signal. It would be desirable to digitize video signal before two-dimensional high-pass spatial filtering, but thirteen-bit to fourteen bit conversion accuracy is required. The high-pass filtering can be carried out using tapped-delay-line filtering where the short delay lines are provided by clocked shift registers and the long delay lines by read-then-write serial memories. The slicing of the high-pass-filtered digitized video signal into ranges can be carried on by digital window comparators, and the slices applied together with gain control signals as digital inputs to read-only memory(s) used for fast multiplication of the slices by their respective gain control signals before being added back together. Digital zone comparison would be followed by accumulation of zone comparator outputs in lieu of integration, and the accumulator outputs would be stored at the end of each frame in a digital latch to supply gain control signal bits to the read-only memory(s) used for fast multiplication. Gamma correction can be provided in the read-only memory(s). Finally, digital-to-analog conversion can be used to generate conventional television signals. The method claims which follows should be constructed to include such digital variants of the invention within its scope.

What is claimed:

1. A real-time method of compressing the dynamic range of a video signal descriptive of successive fields of image scanning, said video signal having content responsive to any low-spatial-frequency portions of a scanned image and having content responsive to any high-spatial frequency portions of the scanned image, said method comprising the following steps:
   removing substantial portions of the content of said video signal responsive to any low-spatial-frequency portions of the scanned image to leave the video signal with remaining content solely responsive to any high-spatial-frequency portions of the scanned image;
   continuously determining into which of a successive number of successive ranges the amplitude of the remaining content falls;
   developing from these determinations, for each successive field of said video signal, histograms of how great a portion of an area in each field contains the remaining content in each of the ranges;
   predicting from these histograms how great a portion of each area in the current field the remaining content will be in each of the ranges; and
   amplifying during the current field the portions of the remaining content in each range in direct relationship with how great a portion of the area in the current field the remaining content is predicted to be in that range.

2. A method for compressing the dynamic range of raster-scanned video signal, comprising the steps of;
   performing a two-dimensional high-pass spatial filtering of said raster-scanned video signal;
   determining into which of a number of successive ranges the amplitude of said high-pass filtered video signal falls;
   developing from these determinations, for each field of said video signal, a histogram of how great a portion of each field contains the high-pass filtered video signal in each of its ranges; and
   amplifying during each field the portions of the high-pass filtered video signal in each range, in accordance with a gain in direct relationship with how great a portion of the preceding field contained the high-pass filtered signal in that range.

3. A piecewise-linear amplifier in which response is linear over each of a plurality of successive ranges of input signal amplitude, said ranges being n at least three in number, ordinally numbered first through $n^{th}$ in order of increasing amplitude range, which piece-wise-linear amplifier comprises:
   an input signal terminal;
   an output signal terminal;

a plurality, n in number, of clippers ordinally numbered first through $n^{th}$, having respective input connections to said input signal terminal and having respective output connections at which are respectively supplied response to zones ordinally numbered with numbers equal to or lower than the ordinal numbers of the respective clippers; and a plurality, n in number, of differential-input amplifiers with respective gains that at least at times differ from each other, said differential-input amplifiers being ordinally numbered first through $n^{th}$, the first said differential-input amplifier having one of its inverting and non-inverting input connections connected to receive a level corresponding to the minimum signal level in said first range and the other of its input connections connected to the output connection of said first clipper, and each of the remaining ones of said differential-input amplifiers having one of its inverting and non-inverting input connections to the output connection of the clipper ordinally numbered the same as it is and the other of its input connections connected to the output connection of the clipper ordinally numbered one less than it is; and means for summing the output responses of said differential-input amplifiers to obtain the overall response applied to said output signal terminal.

4. A piecewise-linear applifier as set forth in claim 3 wherein said first through $n^{th}$, differential-input amplifiers have electrically controllable gains.

5. A piecewise-linear amplifier as set forth in claim 4 in combination with:

a zone comparator having an input connection to said input signal terminal and having n output connections ordinally numbered corresponding to said n zones of input signal for supplying a logic ONE from the output connection ordinally numbered similarly with the zone the amplitude of the input signal is presently in and a logic ZERO from the other output connections;

means for integrating over each of successive time intervals of similar duration the output signals from the output connections of said zone comparator;

means for gain-controlling during each of these time intervals each of said gain-controllable amplifiers in accordance with the integrated zone comparator output signal from the output connection of the zone comparator ordinally numbered similar to that gain controllable amplifier, as determined during the preceding time interval.

6. A combination as set forth in claim 5 wherein the gain of each of said differential-input amplifiers is directly related to the proportion of the preceding time interval said input signal was in the range similarly ordinally numbered.

7. A compressor comprising the combination set forth in claim 6 preceded in cascade connection by a high-pass filter.

8. A compressor as set forth in claim 7 wherein the signal being compressed is a raster-scanned video signal and said high-pass filter is a two-dimensional spatial filter.

* * * * *

UNITED STATES PATENT AND TRADEMARK OFFICE
CERTIFICATE OF CORRECTION

PATENT NO. : 4,516,167

DATED : May 7, 1985

INVENTOR(S): Donald F. Dion et al.

It is certified that error appears in the above-identified patent and that said Letters Patent is hereby corrected as shown below:

Column 2, line 22, "182" should be --3/4--

Column 5, line 21, "degenerative" should be --degeneration--

Signed and Sealed this

Twenty-fourth Day of September 1985

[SEAL]

Attest:

Attesting Officer

DONALD J. QUIGG

Commissioner of Patents and Trademarks—Designate